Jan. 1, 1929.                    S. L. CONNELL                    1,697,226
                              MECHANICAL MOTOR
                             Filed Feb. 18, 1925

Inventor
Stanley L Connell
By H. L. Lind
    Attorney

Patented Jan. 1, 1929.

1,697,226

UNITED STATES PATENT OFFICE.

STANLEY L. CONNELL, OF GIRARD, PENNSYLVANIA, ASSIGNOR TO THE GIRARD MODEL WORKS INC., OF GIRARD, PENNSYLVANIA, A CORPORATION OF PENNSYLVANIA.

MECHANICAL MOTOR.

Application filed February 18, 1925. Serial No. 10,123.

Mechanical motors for spring-driven toys give some difficulty as to the means of locking the spring as it is wound. Where a spring-actuated pawl is used a spring of sufficient tension to assure the proper operation of the pawl gives such engagement to the pawl against reverse movement that the springs are often broken through a reverse winding of the spring. The present invention contemplates the use of a pawl having two dogs, thus reducing any resistance to the turning of the ratchet wheel with reverse winding through the over-running of the toy, or the running of the toy by the user. In this way the breakage of springs is very much reduced. Further such a pawl can be conveniently mounted in the device and the absence of necessity for a spring cheapens the mounting—an important feature in devices of this kind. Other features and details of the invention will appear from the specification and claims.

The invention is illustrated in the accompanying drawings as follows:—

Figure 1:
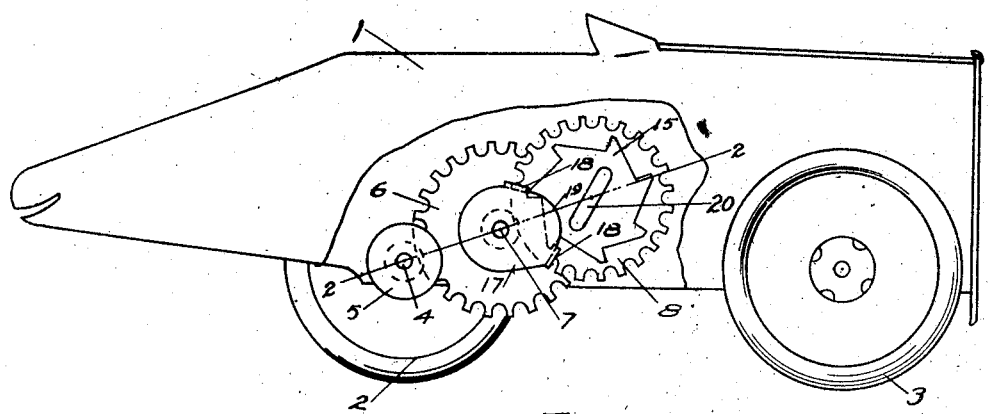

Fig. 1 shows a side elevation of a toy including a mechanical motor, a part of the body being broken away to show construction.

Figure 2:
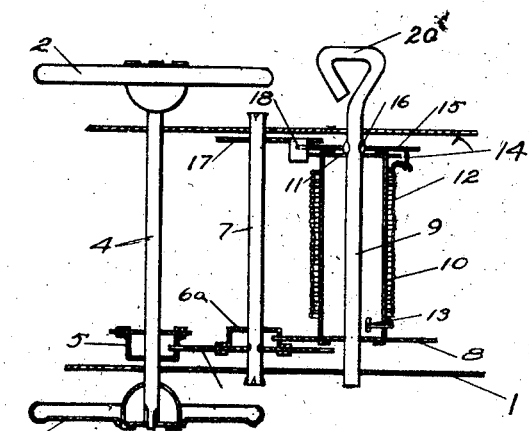

Fig. 2 a section on the line 2—2 in Fig. 1.

1 marks the body. This as shown is in the form of an automobile and is made of sheet metal with side members. The toy is provided with the driving wheels 2 and loose wheels 3. The driving wheels are carried by an axle 4 journaled in the side members of the body. An axle gear 5 is fixed on the axle 4. An intermediate gear 6 meshes with the axle gear 5. The intermediate gear is mounted on a shaft 7, the shaft 7 being mounted in the side members of the body. A gear $6^a$ is fixed with the gear 6 and a driving gear 8 meshes with the gear $6^a$. The driving gear 8 is mounted on a spring shaft 9. The spring shaft 9 is mounted in the side members of the body. A spring drum 10 is secured at one end to the gear 8 and at the opposite end to a disc 11. A coil spring 12 is arranged over the drum 10 and is anchored at one end on the drum at 13 and at the opposite end on the ratchet wheel 15 at 14. The ratchet wheel is mounted on the spring shaft 9 and is fixed against rotation thereon by the up-set portions 16.

A pawl 17 is pivotally mounted on the shaft 7. It has the dogs 18 arranged following the ordinary construction of a pawl at each side of the line connecting the axes of the pawl and the ratchet wheel. The pawls operate on the teeth of the ratchet wheel and thus lock it as the spring is wound, the dogs operating alternately. The pawl has an extension 19 which extends between the side member of the body and the ratchet wheel and thus locks the pawl on the shaft 7 so that it is only necessary to perforate the plate forming the pawl and mount it pivotally on this shaft. The spring shaft 9 is provided with a handle 20 by means of which the shaft may be turned and the spring wound.

What I claim as new is:—

1. In a mechanical motor, the combination of a frame having side members; a spring shaft; a spring on the shaft; a gear driven by the spring; a ratchet connected with the spring and mounted on the spring shaft; a pawl shaft mounted in the side members; and a pawl mounted on the pawl shaft having two dogs operating on the ratchet at opposite sides of a line between the axes of the ratchet and pawl, said pawl having an extension extending between the ratchet wheel and a side member to retain the pawl in place on the shaft.

2. In a mechanical motor, the combination of a frame having side members; an axle mounted on the side members; a gear on the axle; an intermediate shaft mounted on the side members; a gear on the intermediate shaft meshing with the gear on the axle; a spring shaft; a driving gear on the spring shaft driving the intermediate gear; a ratchet wheel on the spring shaft; a spring between the ratchet wheel and driving gear; and a rocking pawl pivotally mounted on the intermediate shaft and having two dogs operating on the ratchet wheel.

3. In a mechanical motor, the combination of a frame having side members; an axle mounted on the side members; a gear on the axle; an intermediate shaft mounted on the side members; a gear on the intermediate shaft meshing with the gear on the axle; a spring shaft; a driving gear on the spring shaft driving the intermediate gear; a ratchet wheel on the spring shaft; a spring between the ratchet wheel and driving gear; and a rocking pawl pivotally mounted on the intermediate shaft and having two dogs operating on the ratchet wheel, said pawl having an extension between a side member and the ratchet wheel holding the ratchet pawl in place on the intermediate shaft.

In testimony whereof I have hereunto set my hand.

STANLEY L. CONNELL.